United States Patent
Tomii

(10) Patent No.: US 10,498,929 B2
(45) Date of Patent: Dec. 3, 2019

(54) APPARATUS FOR READING IMAGE FORMED ON SHEET EITHER FED FROM SHEET FEEDER OR PLACED ON PLATEN

(71) Applicant: CANON KABUSHIKI KAISHA, Tokyo (JP)

(72) Inventor: Hiroshi Tomii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/189,054

(22) Filed: Nov. 13, 2018

(65) Prior Publication Data
US 2019/0149700 A1 May 16, 2019

(30) Foreign Application Priority Data

Nov. 14, 2017 (JP) ................. 2017-219327

(51) Int. Cl.
*G03G 15/00* (2006.01)
*H04N 1/60* (2006.01)

(52) U.S. Cl.
CPC ....... *H04N 1/6033* (2013.01); *G03G 15/5062* (2013.01); *G03G 15/55* (2013.01); *G03G 15/5029* (2013.01); *G03G 2215/00067* (2013.01); *H04N 1/6027* (2013.01)

(58) Field of Classification Search
CPC ........... G03G 15/5041; G03G 15/5062; H04N 1/6005; H04N 1/6033; H04N 1/6044; H04N 1/6097

USPC ...................................... 399/15, 72
See application file for complete search history.

(56) References Cited

U.S. PATENT DOCUMENTS

| | | | |
|---|---|---|---|
| 9,516,196 B2* | 12/2016 | Zaima | H04N 1/6005 |
| 9,854,133 B2* | 12/2017 | Takemura | H04N 1/6044 |
| 2007/0285743 A1 | 12/2007 | Hirayama | |
| 2017/0308017 A1 | 10/2017 | Tomii | |
| 2018/0129154 A1 | 5/2018 | Tomii et al. | |
| 2018/0239290 A1 | 8/2018 | Tomii | |
| 2019/0041784 A1 | 2/2019 | Yago et al. | |
| 2019/0041785 A1 | 2/2019 | Tomii et al. | |
| 2019/0045068 A1 | 2/2019 | Tanaka et al. | |

FOREIGN PATENT DOCUMENTS

JP      2007-329929 A      12/2007

* cited by examiner

*Primary Examiner* — William J Royer
(74) *Attorney, Agent, or Firm* — Venable LLP

(57) ABSTRACT

In a case where a first mode, in which a reader reads test patterns while sheets are fed to the reader by a document feeder, is executed, an image forming apparatus forms a first test pattern on a first sheet and a second test pattern on a second sheet before the first test pattern on the first sheet placed on an original tray of the document feeder is read by the reader. In a case where a second mode, in which the reader reads the test patterns on the sheets without feeding the sheets by the document feeder is executed, the apparatus forms the second test pattern after a reading of the first test pattern on the first sheet is started by the reader.

11 Claims, 14 Drawing Sheets

FIG. 6A

| SHEET CLASSIFICATION | SHEET RANGE | IMAGE FORMING CONDITION | ADF | READING MODE |
|---|---|---|---|---|
| CLASSIFICATION 1 : 64gms TO 105gms | A | α | POSSIBLE | FIRST MODE |
| CLASSIFICATION 2 : 106gms TO 128gms | B | β | | SECOND MODE |
| CLASSIFICATION 3 : 129gms TO 220gms | | | | |
| CLASSIFICATION 4 : 221gms TO 300gms | | | IMPOSSIBLE | |

FIG. 6B

| NUMBER OF TEST CHARTS | FIRST MODE | | SECOND MODE | |
|---|---|---|---|---|
| | NUMBER OF TIMES FOR ADF STACKING | CALIBRATION TIME | NUMBER OF TIMES FOR ADF STACKING | CALIBRATION TIME |
| 1 | ONCE | 25 SECONDS | ONCE | 30 SECONDS |
| 2 | ONCE | 30 SECONDS | TWICE | 60 SECONDS |
| 3 | ONCE | 35 SECONDS | THREE TIMES | 90 SECONDS |
| 4 | ONCE | 40 SECONDS | FOUR TIMES | 120 SECONDS |

FIG. 6C

| SHEET CLASSIFICATION | SHEET RANGE | IMAGE FORMING CONDITION |
|---|---|---|
| CLASSIFICATION 1 : 64gms TO 105gms | A | α |
| CLASSIFICATION 2 : 106gms TO 128gms | A | α |
| CLASSIFICATION 3 : 129gms TO 220gms | B | β |
| CLASSIFICATION 4 : 221gms TO 300gms | B | β |

| | ADF | READING MODE |
|---|---|---|
| | POSSIBLE | FIRST MODE |
| | IMPOSSIBLE | SECOND MODE |

FIG. 6D

| SHEET SIZE | ADF | READING MODE |
|---|---|---|
| LTR | POSSIBLE | FIRST MODE |
| A4 | POSSIBLE | FIRST MODE |
| LGR | IMPOSSIBLE | SECOND MODE |
| A3 | IMPOSSIBLE | SECOND MODE |

FIG. 6E

| GRAMMAGE | MATERIAL OR THE LIKE | ADF | READING MODE |
|---|---|---|---|
| 50gms TO 63gms | RECYCLED PAPER | IMPOSSIBLE | SECOND MODE |
| 50gms TO 63gms | THIN PAPER | POSSIBLE | FIRST MODE |
| 64gms TO 128gms | PLAIN PAPER | POSSIBLE | FIRST MODE |
| 129gms TO 220gms | THICK PAPER | POSSIBLE | FIRST MODE |
| 129gms TO 220gms | COATED PAPER | IMPOSSIBLE | SECOND MODE |

FIG. 8

801b — TEST CHART FOR SCREEN b

| K1 | C1 | M1 | Y1 |
|----|----|----|----|
| K2 | C2 | M2 | Y2 |
| K3 | C3 | M3 | Y3 |
| K4 | C4 | M4 | Y4 |
| K5 | C5 | M5 | Y5 |
| K6 | C6 | M6 | Y6 |
| K7 | C7 | M7 | Y7 |
| K8 | C8 | M8 | Y8 |
| K9 | C9 | M9 | Y9 |
| K10 | C10 | M10 | Y10 |

801a — TEST CHART FOR SCREEN a

| K1 | C1 | M1 | Y1 |
|----|----|----|----|
| K2 | C2 | M2 | Y2 |
| K3 | C3 | M3 | Y3 |
| K4 | C4 | M4 | Y4 |
| K5 | C5 | M5 | Y5 |
| K6 | C6 | M6 | Y6 |
| K7 | C7 | M7 | Y7 |
| K8 | C8 | M8 | Y8 |
| K9 | C9 | M9 | Y9 |
| K10 | C10 | M10 | Y10 |

CONVEYANCE DIRECTION ↓

APPARATUS FOR READING IMAGE FORMED ON SHEET EITHER FED FROM SHEET FEEDER OR PLACED ON PLATEN

BACKGROUND OF THE INVENTION

Field of the Invention

The present invention relates to an apparatus for reading an image formed on a sheet fed from a sheet feeder.

Description of the Related Art

The density of an image that an electrophotographic type image forming apparatus forms on a sheet fluctuates in accordance with various factors. For example, when environmental conditions such as the temperature or humidity change or when a part of an image forming apparatus changes over time, the density of an image formed by the image forming apparatus also changes. Accordingly, the image forming apparatus performs a calibration for controlling the density of an image to a target density. In the calibration, an image density is obtained by forming a test pattern on a sheet and reading it by a sensor, and parameters are corrected in order to adjust the image density so that the image density becomes the target density. Note that parameters for adjusting the image density are controlled by parameters that correspond to the type of a sheet (grammage, the existence or absence of a coating, whether it is recycled paper, and so on). Here, an image forming apparatus recited in Japanese Patent Laid-Open No. 2007-329929 reduces an operational burden for a calibration by using an automatic document feeder (ADF) to cause a test chart to be conveyed, in order to read the test chart.

Incidentally, from sheets onto which an image can be formed by an image forming apparatus, there are sheets that are difficult to convey by an ADF (for example, thick paper, coated paper, and recycled paper). When causing such a sheet to be conveyed by an ADF, there is a possibility for a jam to occur. However, calibration is necessary even for such a sheet.

SUMMARY OF THE INVENTION

The present invention provides an image forming apparatus comprising: a reader configured to read an original placed on a platen glass; a document feeder having an original tray on which the original is placed and configured to feed the original on the original tray to read the original placed on the original tray by the reader; an image forming unit configured to form an image on a sheet based on a reading result of the original by the reader; and a controller configured to: control the image forming unit to form test patterns on a plurality of sheets; control the reader to read the test patterns on the plurality of sheets; and control, based on a reading result of the test patterns, an image forming condition of the image forming unit, wherein the image forming unit forms a first test pattern on a first sheet among the plurality of sheets; the image forming unit forms a second test pattern on a second sheet among the plurality of sheets after the first test pattern is formed on the first sheet, wherein in a case where a first reading mode in which the reader reads the test patterns on the plurality of sheets while the plurality of sheets are fed to the reader by the document feeder is executed, the controller controls the image forming unit to form the first test pattern on the first sheet and to form the second test pattern on the second sheet before the first test pattern on the first sheet placed on the original tray is read by the reader, wherein in a case where a second reading mode in which the reader reads the test patterns on the plurality of sheets without feeding the plurality of sheets by the document feeder is executed, the controller controls the image forming unit to form the second test pattern on the second sheet after a reading of the first test pattern on the first sheet with the reader starts.

Further features of the present invention will become apparent from the following description of exemplary embodiments (with reference to the attached drawings).

BRIEF DESCRIPTION OF THE DRAWINGS

FIGS. 6A to 6E are views for describing a relationship between information related to the type of a sheet, and a reading mode.

FIG. 8 is a view for illustrating a test chart.

DESCRIPTION OF THE EMBODIMENTS

<First Embodiment>

[Image Forming Apparatus]

Figure 1:
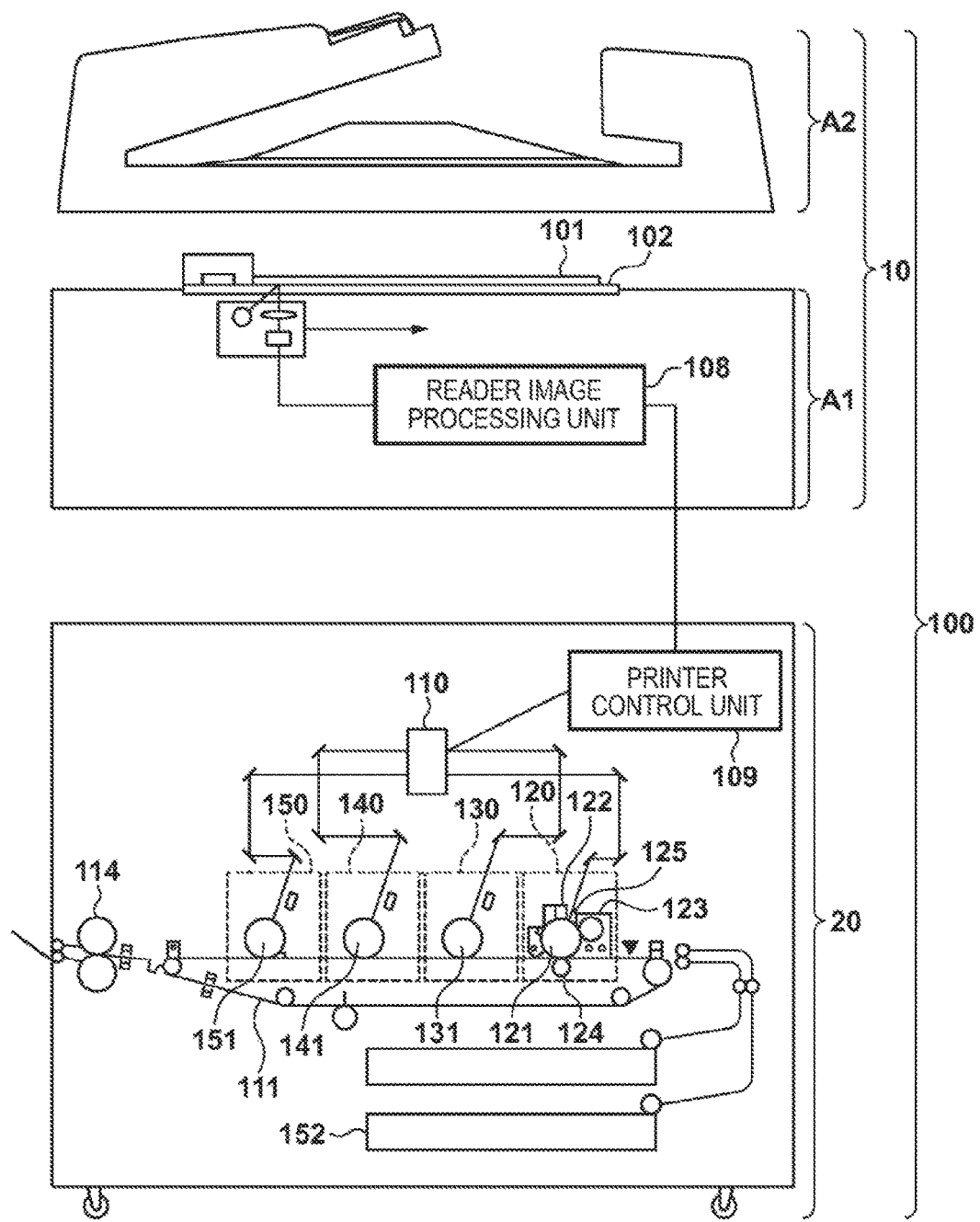
FIG. 1 is a view for describing an image forming apparatus.

An image forming apparatus 100 illustrated in FIG. 1 has a reader 10 for reading an image of an original, and a printer 20 for forming an image obtained by the reader 10 on a sheet. The reader 10 has a document scanner A1 and an ADF unit A2.

The reader 10 is an example of a reading unit for reading an original conveyed by the ADF unit A2, or an original set on an original platen glass 102. The reader 10 can read an original 101 that is set on the original platen glass 102. A reader image processing unit 108 converts an electrical signal generated by reading the original 101 to an image signal, and outputs it to a printer control unit 109 of the printer 20. The printer control unit 109 executes image processing on the image signal, and causes the printer 20 to form an image based on the image signal on which the image processing has been executed.

The printer 20 is provided with image forming units 120, 130, 140, and 150, a laser scanner 110, a transfer belt 111, a fixing device 114, and a cassette 152. The image forming unit 120 forms a yellow (Y) image, the image forming unit 130 forms a magenta (M) image, the image forming unit 140 forms a cyan (C) image, and the image forming unit 150 forms a black (Bk) image. Configurations of the image forming units 120, 130, 140, and 150 are substantially the same. Description is given below for the configuration of the yellow image forming unit 120.

The image forming unit 120 has a photosensitive drum 121 that rotates in a predetermined direction. Around the photosensitive drum 121, a charger 122, a developer 123, and a transfer roller 124 are arranged in an order that follows the rotational direction of the photosensitive drum 121. The charger 122 is a corona charger for charging the photosensitive drum 121 in a non-contact manner. In addition, the charger 122 may contact the photosensitive drum 121, and may be a charging roller or a charging brush provided nearby. The laser scanner 110 emits an exposure light in accordance with the image signal onto the charged photosensitive drum 121. By this, an electrostatic latent image is formed on the surface of the photosensitive drum 121. The developer 123 contains a developing agent that includes yellow toner. At a time of development of an electrostatic latent image, the developer 123 uses toner to develop an electrostatic latent image formed on the photosensitive drum 121. By this, a toner image is formed on the photosensitive drum 121. The transfer belt 111 is a belt that is rotationally driven in a predetermined direction. The transfer roller 124 forms a transfer nip portion by pressing the photosensitive drum 121 through the transfer belt 111. The image forming unit 120 is also provided with a surface electrometer 125 for measuring the surface potential of the photosensitive drum 121.

Next, an image forming operation of the image forming apparatus 100 is described. The surface of the photosensitive drum 121 is uniformly charged by the charger 122. Next, when the laser scanner 110 exposes the photosensitive drum 121 based on a yellow-component image signal outputted from the reader 10, an electrostatic latent image corresponding to a yellow-component image is formed on the photosensitive drum 121. The electrostatic latent image corresponding to the yellow-component image that is formed on the photosensitive drum 121 is visualized as a yellow toner image by the developer 123. The yellow toner image is conveyed to the transfer nip portion in conjunction with rotation of the photosensitive drum 121.

In addition, sheets are stored in the cassette 152, and sheets are supplied one at a time by the feeding roller, and are conveyed to registration rollers. The registration rollers feed a sheet to the transfer belt 111 so that the sheet comes in contact with the yellow toner image at the transfer nip portion. When the yellow toner image on the photosensitive drum 121 and the sheet enter the transfer nip portion, a transfer voltage is applied to the transfer roller 124, and the yellow toner image on the photosensitive drum 121 is transferred to the sheet.

In addition, a magenta toner image is formed on a photosensitive drum 131, a cyan toner image is formed on a photosensitive drum 141, and a black toner image is formed on a photosensitive drum 151. A full-color toner image is formed on the sheet when the magenta toner image, the cyan toner image, and the black toner image are overlappingly transferred onto the sheet which is supported by the transfer belt 111. The sheet onto which the toner images are formed is conveyed from the transfer belt 111 to the fixing device 114, and is heated by a heater (not shown) while being pinched and conveyed by a pair of rollers of the fixing device 114. By this, the toner image on the sheet is fixed to the sheet. The sheet to which the toner image has been fixed is discharged to a discharge tray by discharge rollers.

[Document Scanner]

Figure 2:
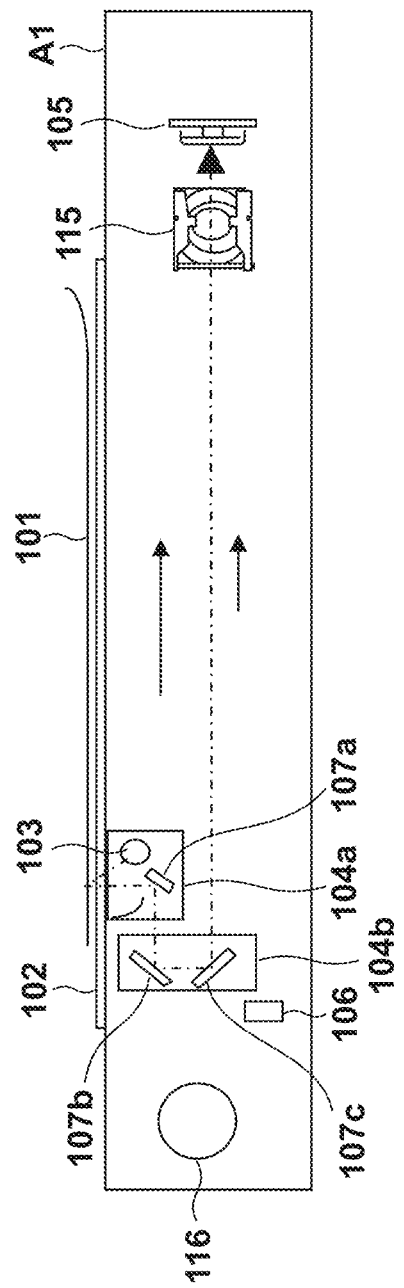
FIG. 2 is a view for describing a document scanner.

FIG. 2 is a cross-sectional view that illustrates a configuration of the document scanner A1. The document scanner A1 has a first mode for reading the original 101 while the original 101 is being conveyed by the ADF unit A2, and a second mode for reading the original 101 which is set on the original platen glass 102. The ADF unit A2 is a conveyance unit. The original platen glass 102 is a sheet tray. The first mode is referred to as flow-reading or ADF reading. The second mode is referred to as document fixed reading or original fixed reading.

The document scanner A1 is provided with the original platen glass 102, a first mirror unit 104a, a second mirror unit 104b, a lens 115, an image sensor 105, a home position sensor 106, and a motor 116. The first mirror unit 104a is provided with an original illuminating lamp 103 that functions as a light source, and a first mirror 107a. In the second mode, the first mirror unit 104a moves in an arrow direction in a state where the original illuminating lamp 103 is on, in order to read the original 101. By this, light reflected from the original 101 is deflected to the second mirror unit 104b by the mirror. The second mirror unit 104b is provided with a second mirror 107b and a third mirror 107c for deflecting the light deflected by the mirror of the first mirror unit 104a to the lens 115. In the second mode, the second mirror unit 104b also moves in the arrow direction in order to read the original 101. The lens 115 is an optical system for forming the light deflected by the second mirror unit 104b on the image sensor 105. The image sensor 105 is provided with red, green, and blue filters. Accordingly, the image sensor 105 outputs red, green, and blue image signals. The motor 116 is a driving source for driving the first mirror unit 104a and the second mirror unit 104b. The home position sensor 106 is a sensor for detecting the positions of the first mirror unit 104a and the second mirror unit 104b.

The motor 116 rotates when the first mode is selected. By this, the first mirror unit 104a and the second mirror unit 104b move to a predetermined position and stop in order to read the original 101 which is conveyed to a flow-reading position. The image sensor 105 reads the original 101 which is conveyed to the flow-reading position by the ADF unit A2. In other words, the document scanner A1 turns the original illuminating lamp 103 on, and emits light onto the original 101 which passes the flow-reading position. The first mirror 107a provided in the first mirror unit 104a and the second mirror 107b and the third mirror 107c provided in the second mirror unit 104b deflect light reflected from the original 101 (image light), and guide it to the lens 115. The lens 115 causes image light to form on the image sensor 105. The image sensor 105 converts the image light to an electrical signal, and outputs the electrical signal to the reader image processing unit 108. Alternatively, the ADF unit A2 conveys the original 101 onto the original platen glass 102, and causes the original 101 to stop at a reading position on the original platen glass 102. The first mirror unit 104a and the second mirror unit 104b resume movement, and read the original 101. Subsequently, the ADF unit A2 resumes conveyance of the original 101, and discharges it. In this way, the first mode may have two types of reading methods.

When the second mode is selected, the first mirror unit 104a and the second mirror unit 104b first return to a home position for the home position sensor 106 by the motor 116 rotating. The document scanner A1 turns the original illuminating lamp 103 on, and emits light onto the original 101. While the first mirror unit 104a and the second mirror unit 104b are moving in the arrow direction of the original 101, the first mirror 107a, the second mirror 107b and the third mirror 107c deflect light reflected from the original 101 (image light), and guide it to the lens 115. The lens 115 causes the image light to form on the image sensor 105. The image sensor 105 converts the image light to an electrical signal, and outputs the electrical signal to the reader image processing unit 108.

In other words, the first mode is a read operation for reading the original 101 which is conveyed, in a state where the first mirror unit 104a and the second mirror unit 104b are fixed at a predetermined position. In contrast, the second mode is a read operation for reading the original 101 on the original platen glass 102, while causing the first mirror unit 104a and the second mirror unit 104b to move.

[ADF]

Figure 3A:
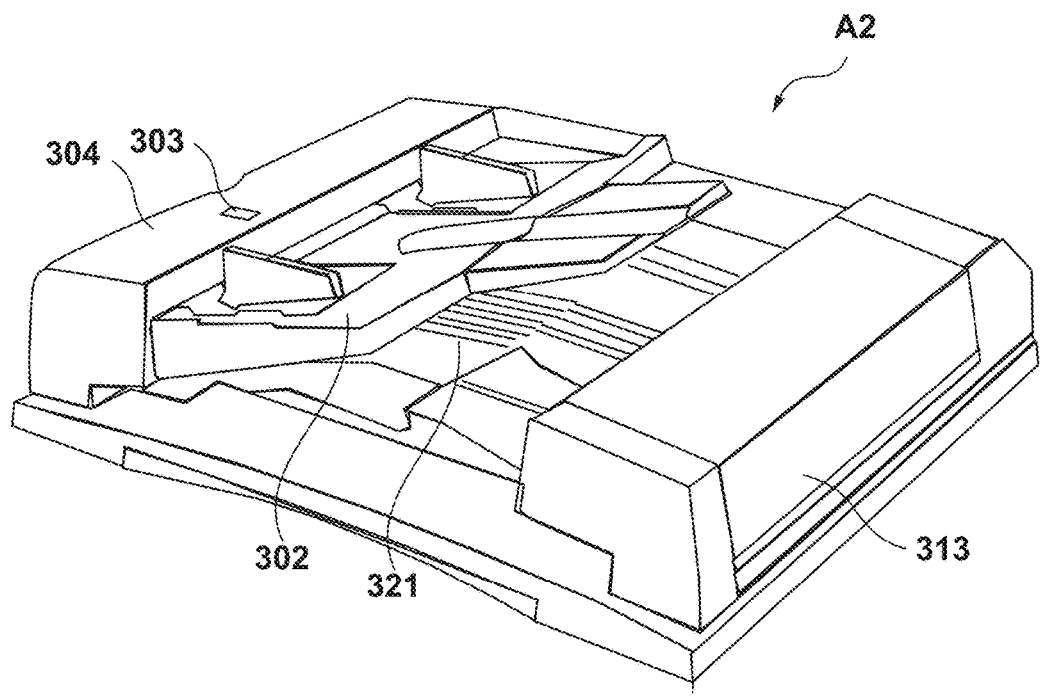
FIGS. 3A and 3B are views for describing an ADF unit.
Figure 3B:
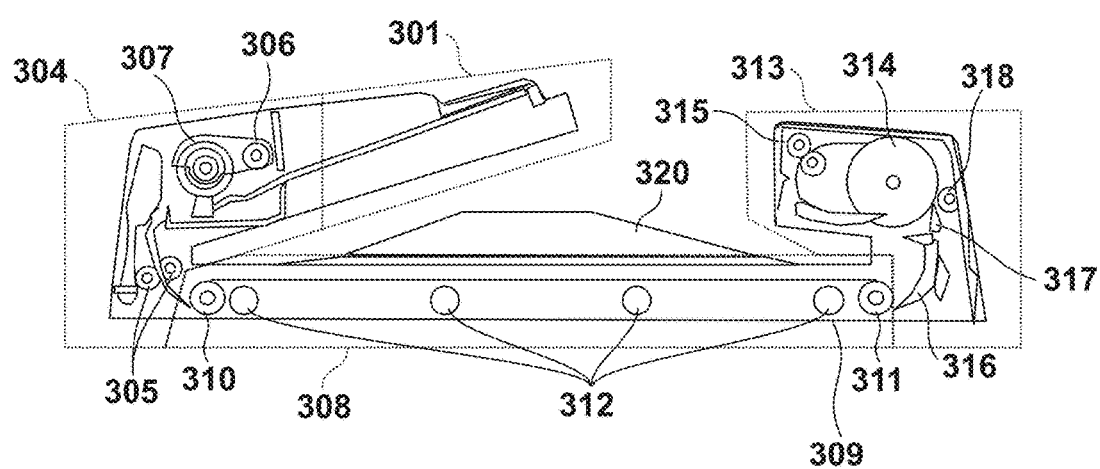

FIG. 3A is a perspective view that illustrates an outer appearance of the ADF unit A2. FIG. 3B is an overview cross-sectional view of the ADF unit A2. An original stacking unit 301 has an original tray 302. One or more sheets of originals 101 are stacked in the original tray 302. The original tray 302 functions as a tray in which sheets are stacked. An original indicator 303 turns on when the originals 101 are stacked in the original tray 302.

An original feeding unit 304 is provided with a pair of rollers 305, a pickup roller 306, and a feeding roller 307 for feeding the originals 101 that are stacked in the original tray 302. The pickup roller 306 is a roller that can rotate and is capable of vertical motion. The pickup roller 306 comes into contact with an original 101 that is positioned uppermost in an original pile stacked in the original tray 302, and conveys the original 101. The feeding roller 307 conveys the original 101 to the pair of rollers 305. The pair of rollers 305 stop when the leading edge of the original 101 has reached the pair of rollers 305. This is in order to correct skewing of the original 101 that abuts the pair of rollers 305. The pair of rollers 305 rotate after a predetermined amount of time since the original 101 arrived at the pair of rollers 305, and convey the original 101 to an original conveyance unit 308.

The original conveyance unit 308 uses a conveyance belt 309 to convey the original 101. The conveyance belt 309 is stretched between a driving roller 310 and a driven roller 311. Furthermore, the conveyance belt 309 is pressed onto the original platen glass 102 by pressing rollers 312. The conveyance belt 309, by frictional force, conveys the original 101 which has entered between the conveyance belt 309 and the original platen glass 102. By this, the original 101 moves on the original platen glass 102. The original conveyance unit 308 causes the conveyance belt 309 to stop when the original 101 reaches the reading position. The original 101 is read by scanning the first mirror unit 104a and the second mirror unit 104b. Subsequently, the original conveyance unit 308 resumes driving of the conveyance belt 309, and conveys the original 101 to a reversal discharge unit 313. Note that the original 101 may be read while the original conveyance unit 308 is conveying the original 101 and while the first mirror unit 104a and the second mirror unit 104b are stopped. In other words, a scan of the original 101 may be realized by moving the original 101 instead of the first mirror unit 104a and the second mirror unit 104b moving.

The reversal discharge unit 313 reverses the front and back of the original 101, and discharges the original 101 to a discharge stack section 320. When an original 101 which is conveyed by the conveyance belt 309 enters the reversal discharge unit 313, a reversal flapper 316 picks up the original 101, and guides it to a reversal roller 314. Furthermore, the reversal roller 314 and a reversal roller 318 which faces the reversal roller 314 sandwich the original 101 and convey the original 101 to a pair of conveying rollers 315. At this time, the reversal roller 314 is rotating in a predetermined direction. When the trailing edge of the original 101 passes a discharge flapper 317, the discharge flapper 317 and the reversal roller 314 rotate. At this time, the reversal roller 314 rotates in a direction opposite to the predetermined direction. By this, the original 101 is subject to switchback conveyance, and is discharged to a discharge tray 321 of the discharge stack section 320.

In other words, the first mode is read processing for conveying and reading the original 101 which is set in the original tray 302, and the second mode is read processing for reading the original 101 which is placed on the original platen glass 102, without conveying the original 101. Note that the first mode and the second mode are automatically switched. The ADF unit A2 has a sensor for detecting that an original 101 is set on the original tray 302. If the sensor detects the original 101 when a read start button from an operation unit U (FIG. 4) is pressed, the document scanner A1 reads an image of the original 101 while causing the original 101 to be conveyed by the ADF unit A2. In contrast, if the sensor does not detect an original when the read start button is pressed, the document scanner A1 reads an original 101 on the original platen glass 102 without causing the original 101 to be conveyed by the ADF unit A2.

[Printer Control Unit]

Figure 4:
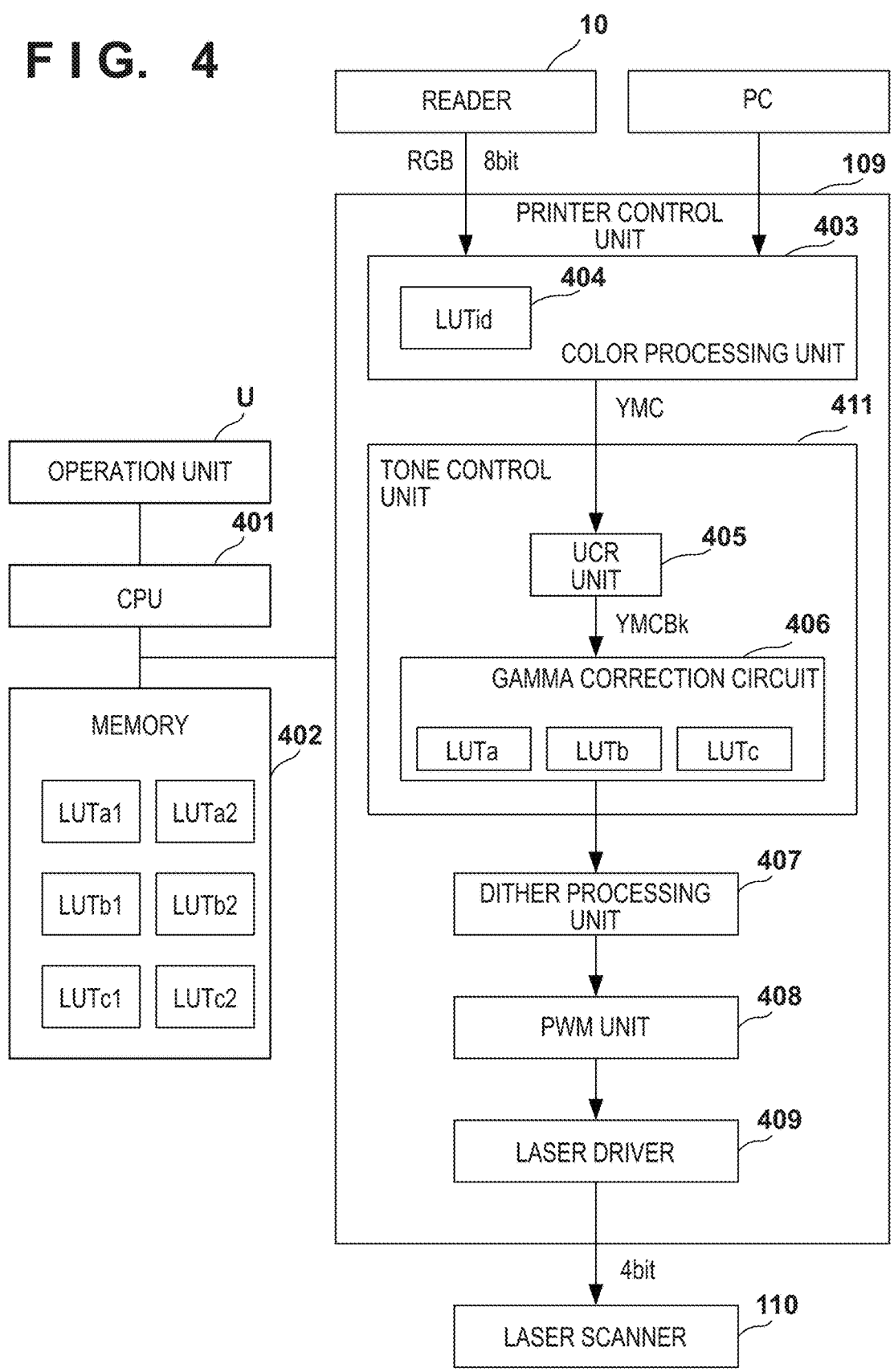
FIG. 4 is a control block view of the image forming apparatus (copying/printing).

FIG. 4 is a control block view of the image forming apparatus 100. The units of the printer control unit 109 are comprehensively controlled by a CPU 401. In other words, the CPU 401 is an example of a controller for controlling the printer 20. A memory 402 has a ROM or a RAM, and stores a control program and various pieces of data. Below, the control block view illustrated in FIG. 4 is used to describe a copy mode in which the image forming apparatus 100 forms an image of an original 101 read by the reader 10 on a sheet. In the copy mode, the reader 10 outputs an image signal based on a result of reading an image of the original 101. The image signal outputted by the reader 10 is inputted to a color processing unit 403 of the printer control unit 109. The color processing unit 403 uses an LUT id 404 to convert an RGB format image signal to a YMC format image signal. The LUT id 404 is a lookup table used to convert an image signal outputted from the reader 10 to an image signal suitable for the printer 20. The YMC image signal is transferred to a tone control unit 411.

The tone control unit 411 is an example of a correction unit that uses a correction condition prepared in accordance with the type of a sheet to correct an inputted image signal. The tone control unit 411 is provided with a UCR unit 405 and a gamma correction circuit 406, and corrects an image signal so that density characteristics (tone characteristics) of the printer 20 align with ideal density characteristics. The UCR unit 405 generates a yellow-component image signal, a magenta-component image signal, a cyan-component image signal, and a black-component image signal from a YMC format image signal. The gamma correction circuit 406 converts the image signals. In a case where the printer 20 forms an image based on image signal values for each color component, the tone characteristics (density characteristics) of an output image will not be ideal tone characteristics. Accordingly, in the copy mode, the gamma correction circuit 406 converts the image signal values based on an LUTa so that tone characteristics (density characteristics) of an image formed on a sheet become ideal density characteristics. The LUTa is a conversion table (tone correction conditions) for correcting density characteristics. The memory 402 holds an LUTa for each type of sheet.

An image signal outputted from the tone control unit 411 is inputted to a dither processing unit 407. The dither processing unit 407 applies dither processing (halftone processing) to the image signal, and outputs to a PWM unit 408. Note that, in the copy mode, the dither processing unit 407 converts an image signal based on a COPY screen. An image signal (8-bit) on which dither processing is performed is converted to 4-bit data, for example. The PWM unit 408 generates a driving signal that has undergone a pulse width modulation in accordance with the image signal, and outputs the driving signal to a laser driver 409. The laser driver 409 causes a semiconductor laser of the laser scanner 110 to emit light in accordance with the driving signal.

The control block view illustrated in FIG. 4 is used below to give a description of a print mode in which the image forming apparatus 100 forms an image on a sheet based on image data in a PDL format, for example. In the print mode, image data is transferred to the printer control unit 109 from a server or a PC. The color processing unit 403 converts the image data to a YMC format image signal. For example, when YMCBk format image data is transferred, the color processing unit 403 applies a gamut conversion to the image data to create an image signal, and transfers the image signal to the gamma correction circuit 406. The gamma correction circuit 406 corrects the image signal, which corresponds to a photograph, a drawing, or graphics, based on an LUTb. The gamma correction circuit 406 corrects an image signal which corresponds to text based on an LUTc. In the print mode, the gamma correction circuit 406 converts the image signal values based on an LUTb or an LUTc so that tone characteristics (density characteristics) of an image formed on a sheet become ideal density characteristics. The LUTb and the LUTc are conversion tables (tone correction conditions) for correcting tone characteristics. The memory 402 holds an LUTb for each type of sheet. Similarly, the memory 402 holds an LUTc for each type of sheet.

The dither processing unit 407 converts an image signal related to an image and an image signal related to graphics based on an image screen so that a photograph or a diagram becomes an image with superior tonality. The dither processing unit 407 converts an image signal related to text based on a text screen so that text is clearly printed. In addition, in a case where a user selects an error diffusion method, the dither processing unit 407 converts an image signal value based on the error diffusion method. Here, for example when moire has occurred in a high-resolution image, a user selects dither processing that uses the error diffusion method in order to suppress the moire.

Here, a number of lines of the COPY screen is 170, a number of lines of the image screen is 190, and a number of lines of the text screen is 280. In addition, for the error diffusion method there is an aperiodic screen. In other words, the error diffusion method has an FM screen, and the COPY screen, the image screen, and the text screen are AM screens. The screens previously described are examples, and the image forming apparatus and control method described in the present invention are not limited to these screens.

Here, as described above, the tone characteristics of an image formed on a sheet by the printer 20 fluctuate depending on environmental changes or wear-and-tear of parts. Furthermore, the tone characteristics of an image differ in accordance with the type of a sheet. Accordingly, the CPU 401 executes calibration to update the LUTa, the LUTb, the LUTc, and correct the tone characteristics of an image to ideal tone characteristics.

[Calibration]

Figure 13:
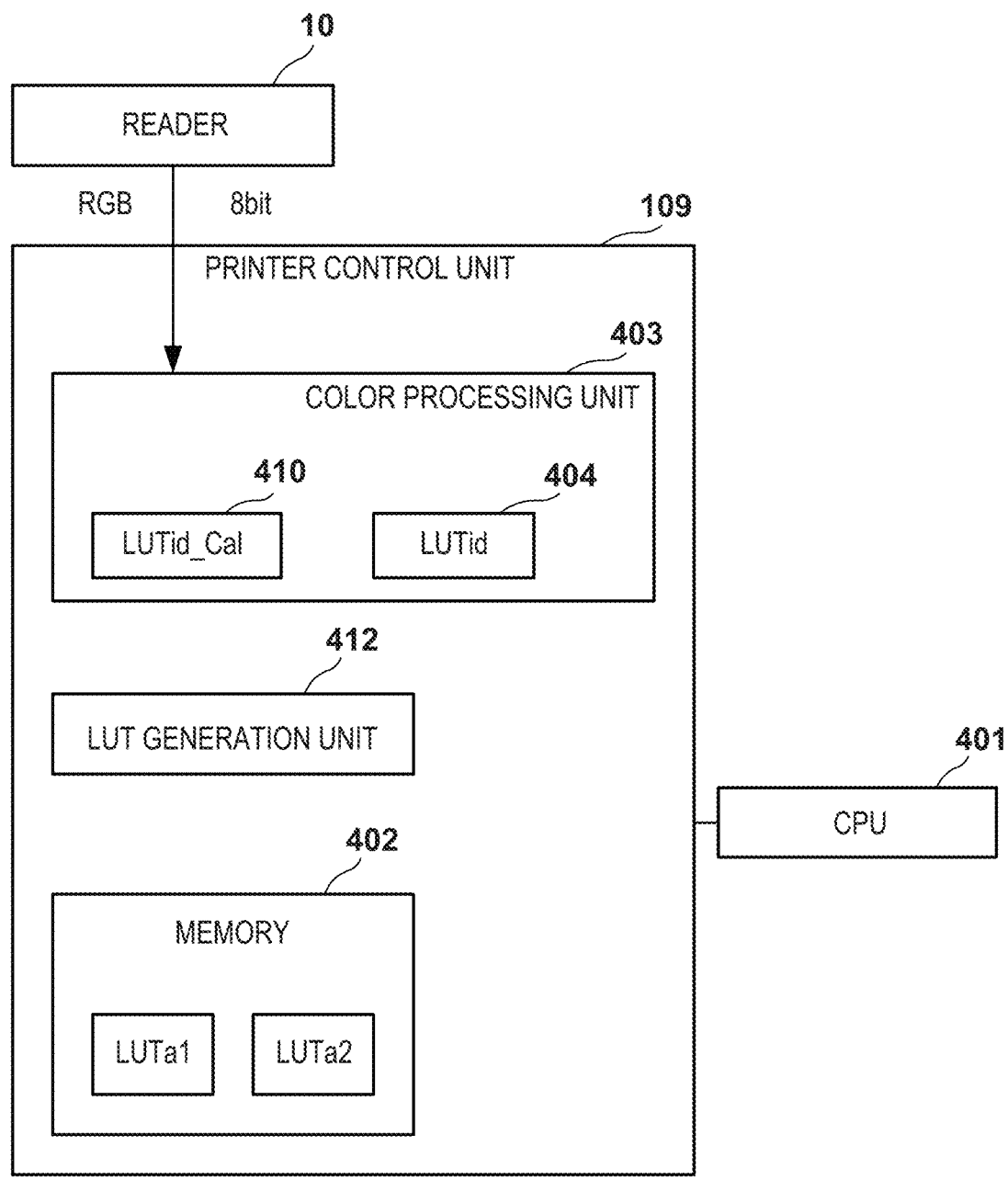
FIG. 13 is a control block view of the image forming apparatus (calibration).

In the embodiment, a calibration is processing for creating an LUTa, an LUTb, and an LUTc for each type of sheet. A control block view illustrated in FIG. 13 is used to give a description below for a calibration that the image forming apparatus 100 performs. The CPU 401 supplies a test image signal to the dither processing unit 407. The CPU 401 controls the printer 20 to form a test image on a sheet, based on test image data to which dither processing has been performed by the dither processing unit 407. A sheet on which a test image has been formed is referred to as a test chart. The test chart is set on the original tray 302 or the original platen glass 102 of the reader 10 by a user. In response to a user pressing the read start button, the reader 10 reads the test chart, and outputs an RGB format image signal to the color processing unit 403. The color processing unit 403 converts the RGB format image signal to densities. Here, if a calibration is executed, the color processing unit 403 uses a calibration-exclusive LUTid_Cal 410 which differs from the LUT id 404 (FIG. 4) to convert the RGB format image signal to densities. The LUTid_Cal 410 includes a table for converting an image signal (R) to a cyan density, a table for converting an image signal (G) to a magenta density, a table for converting an image signal (B) to a yellow density, and a table for converting the image signal (G) to a black density. An LUT generation unit 412 generates an LUTa, an LUTb, and an LUTc for converting image signal values so that the density of the test image which is converted by the color processing unit 403 becomes a target density. The LUT generation unit 412 generates an LUTa based on the density of a test image which is formed using a COPY screen, for example. The LUT generation unit 412 similarly generates an LUTb based on the density of a test image formed by using an image screen, and generates an LUTc based on the density of a test image formed using a text screen. Note that, because a method for generating a tone correction condition based on read data of a test image is publicly known, description here is omitted. In addition, the image forming apparatus 100 described in the present embodiment generates an LUTa, an LUTb, and an LUTc for each type of sheet.

Accordingly, the CPU 401 causes the memory 402 to store identification information that indicates a type of a sheet in association with the LUTa. The CPU 401 similarly causes the memory 402 to store identification information indicating the type of a sheet in association with the LUTb, and causes the memory 402 to store identification information indicating the type of a sheet in association with the LUTc. Note that the LUTa is created for each color. The LUTb is also similarly created for each color. The LUTc is also similarly created for each color.

As described above, the reader 10 can operate in the first mode (ADF reading) or the second mode (document fixed reading). The first mode (ADF reading) has a lower work burden for a user in comparison to the second mode (document fixed reading). However, there is the possibility of a jam occurring in the ADF unit A2 in accordance with the type of sheet. For example, if the grammage of a sheet exceeds a predetermined value or the size of a sheet exceeds a predetermined size, there is the possibility that a jam will occur in the ADF unit A2. Furthermore, there is the possibility that a jam will occur if the ADF unit A2 conveys recycled paper or coated paper. Accordingly, a calibration that uses these types of sheets must be performed in the second mode (document fixed reading).

Figure 5:
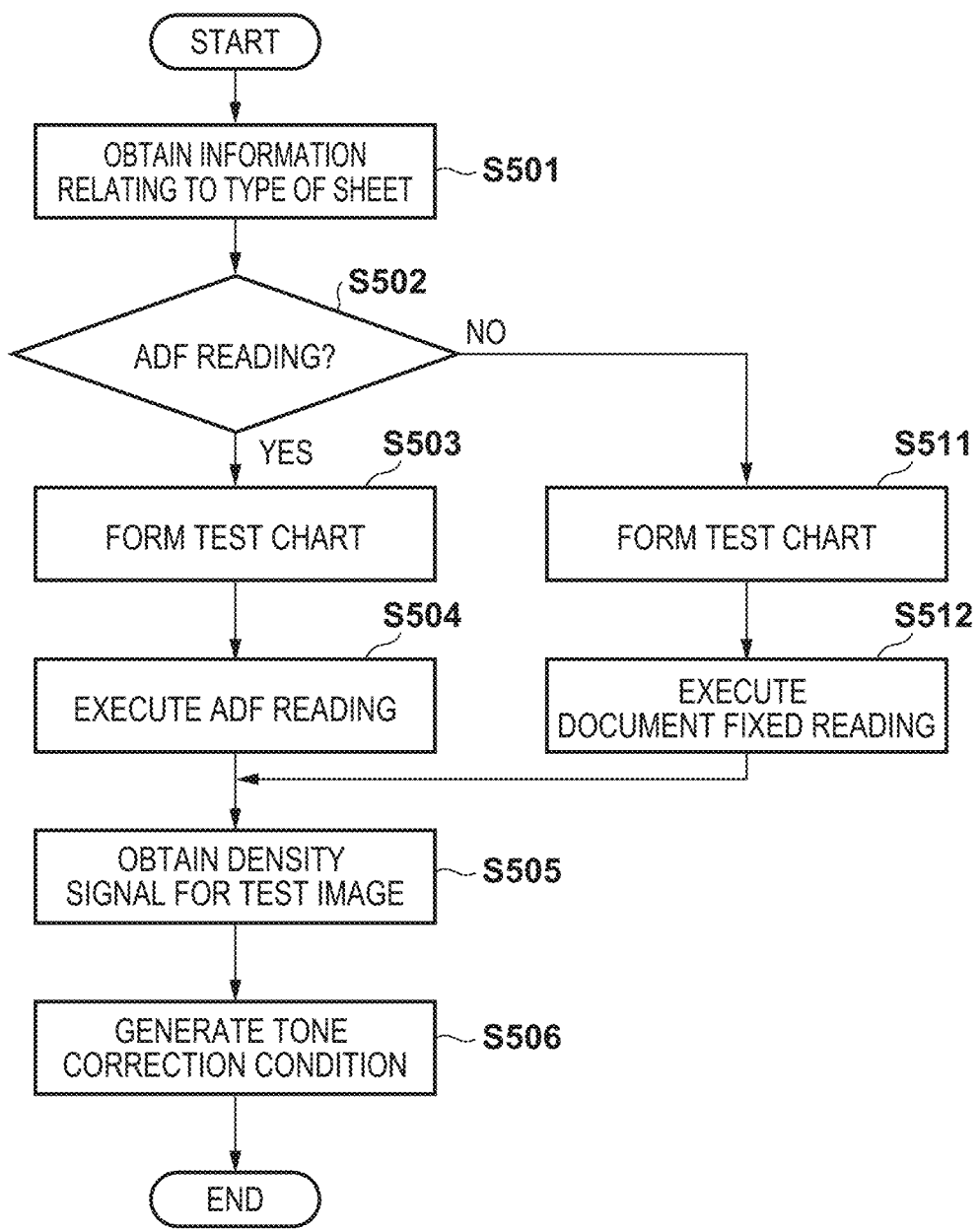
FIG. 5 is a flowchart for illustrating a calibration.

FIG. 5 is a flowchart that illustrates calibration processing for generating an LUTa. FIG. 6A is a table that illustrates an example of a sheet classification. The image forming apparatus 100 described in the present embodiment determines whether or not the first mode (ADF reading) can be executed in accordance with the type of a sheet to be used in a calibration. Furthermore, the image forming apparatus 100 reports to a user whether or not to execute reading of the test chart based on the first mode (ADF reading).

Firstly, in step S501, the CPU 401 obtains information related to the type of a sheet. In the present embodiment, a sheet classification is used as the information relating to the type of a sheet. A sheet classification is a classification of a sheet that is based on a grammage. As illustrated by FIG. 6A, four sheet classifications are provided, for example. Sheets whose grammage is greater than or equal to 64 gms and less than or equal to 105 gms belong to a sheet classification 1. Sheets whose grammage is greater than or equal to 106 gms and less than or equal to 128 gms belong to a sheet classification 2. Sheets whose grammage is greater than or equal to 129 gms and less than or equal to 220 gms belong to a sheet classification 3. Sheets whose grammage is greater than or equal to 221 gms and less than or equal to 300 gms belong to a sheet classification 4. Note that, according to FIG. 6A, the sheet classification 1 and the sheet classification 2 belong to a calibration group referred to as a sheet range A. Image forming conditions α are applied for the sheet range A. The image forming conditions α include an LUTa1, an LUTb1, and an LUTa1. Image forming conditions are control parameters in accordance with the type of a sheet, such as a printing speed, a fixing temperature, a charging potential, and an amount of exposure light. The sheet classification 3 and the sheet classification 4 belong to a calibration group referred to as a sheet range B. Image forming conditions β are applied for the sheet range B. The image forming conditions β include an LUTa2, an LUTb2, and an LUTc2. Note that ADF reading is possible for the sheet classification 1, the sheet classification 2, and the sheet classification 3, but ADF reading is impossible for the sheet classification 4. In the present embodiment, ADF reading (the first mode) is applied for the sheet classification 1 and the sheet classification 2. Document fixed reading (the second mode) is applied for the sheet classification 3 and the sheet classification 4. In other words, the reading mode is selected in accordance with the calibration group or the sheet range. The table illustrated in FIG. 6A is stored in the memory 402 as a control map, and is referred to by the CPU 401.

Figure 7A:
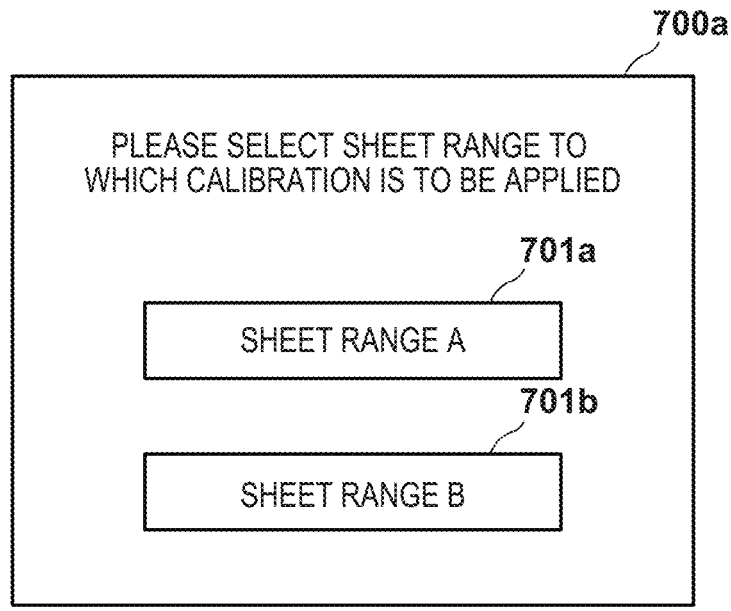
FIGS. 7A to 7C are views for describing UIs.
Figure 7B:
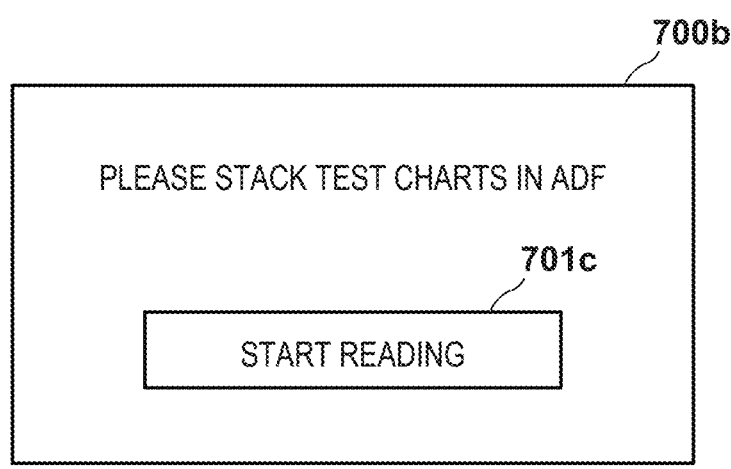
Figure 7C:
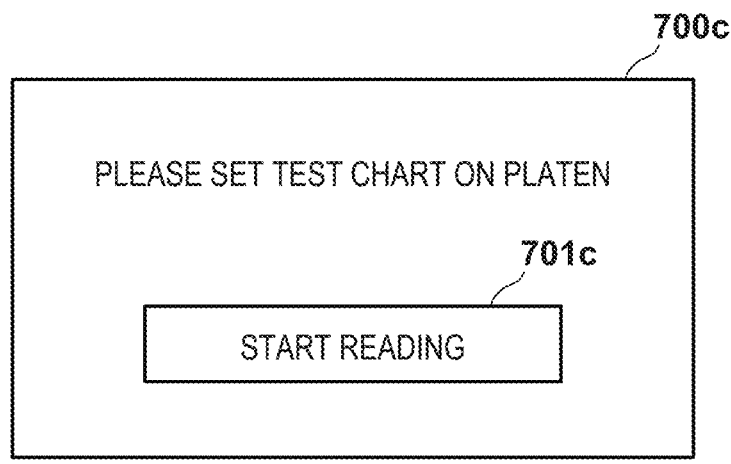

FIGS. 7A through 7C illustrate a screen transition of a display apparatus of the operation unit U in a case where execution of a calibration is instructed. In step S501, the CPU 401 causes the display apparatus of the operation unit U to display a UI 700a (FIG. 7A). The operation unit U is a touch panel display that integrates a display apparatus and an input apparatus. The UI 700a has a button 701a for selecting the sheet range A, and a button 701b for selecting the sheet range B. A user presses one of the button 701a and the button 701b in accordance with a type of sheets stored in the cassette 152. The CPU 401 determines which of the sheet range A and the sheet range B has been selected based on a command outputted from the operation unit U. The sheet range A and the sheet range B are examples of information relating to the type of a sheet.

In step S502, the CPU 401 determines whether ADF reading (the first mode) is possible based on the information that relates to the type of a sheet. In other words, based on the information relating to the type of the sheet, the CPU 401 selects a predetermined reading mode from out of ADF reading (the first mode) and document fixed reading (the second mode). For example, based on the grammage or the sheet classification of a sheet, the CPU 401 determines which of the sheet range A and the sheet range B the sheet belongs to, and the CPU 401 then selects a reading mode that corresponds to the sheet range. Alternatively, when the button 701a for selecting the sheet range A is pressed by a user in the touch panel display, the CPU 401 selects ADF reading (the first mode), and the processing advances to step S503. In contrast, when the button 701b for selecting the sheet range B is pressed by a user in the touch panel display, the CPU 401 selects document fixed reading (the second mode), and the processing advances to step S511.

First Mode (ADF Reading)

In step S503, the CPU 401 controls the printer 20 to cause a test image to be formed on a sheet (sheet range A). In step S503, the CPU 401 sets the image forming conditions α (however, the LUTa1, the LUTb1, and the LUTc1 are not used) to the printer 20, and supplies an image signal for the test image to the dither processing unit 407. The dither processing unit 407 uses a COPY screen to execute dither processing on the supplied image signal for the test image, and transfers an image signal that was subject to this image processing to the printer 20. The printer 20 forms a test image based on the inputted image signal onto a sheet.

FIG. 8 is a view that illustrates examples of test charts outputted from the printer 20. Each of test charts 801a and 801b has test images that comprise 10 tones for each color out of Y, M, C, Bk. Yellow test images formed on the test chart 801a include images of differing tones formed based on ten types of image signals (15, 40, 65, 90, 120, 144, 168, 192, 216, and 255), for example. The plurality of test images formed on the test chart 801a is formed based on image signals for test image that are converted based on a COPY screen. The plurality of test images formed on the test chart 801b is formed based on image signals for test image that are converted based on an image screen, for example. Note that the test charts are not limited to two sheets, and configuration may be such that a test chart, on which test images corresponding to a text screen are formed, is printed, for example. In the following description, it is assumed that the number of test charts is one sheet for convenience of the description.

When a user sets a test chart on the original tray 302 and instructs the start of reading from the operation unit U, in step S504, the CPU 401 executes ADF reading by causing the ADF unit A2 to operate. For example, the CPU 401 may cause a message urging a user to stack a test chart in the ADF unit A2 to be displayed on the operation unit U. As illustrated by FIG. 7B, the operation unit U may display a UI 700b that includes the message and a button 701c for instructing reading to start. When a read start instruction is inputted from the operation unit U, the CPU 401 instructs the reader 10 to perform ADF reading. The reader 10 causes the ADF unit A2 to convey the test chart, and causes the document scanner A1 to read the test chart. The reader image processing unit 108 of the document scanner A1 outputs a luminance signal which indicates a reading result to the printer control unit 109. Subsequently, the CPU 401 advances to step S505.

Second Mode (Document Fixed Reading)

Out of test charts, there are sheets that are difficult for the ADF unit A2 to convey. For example, conveyance by the ADF unit A2 is difficult for a sheet whose grammage is greater than a predetermined value. The sheet range B includes the sheet classification 4 which cannot be conveyed by the ADF unit A2. Note that the sheet range B also includes the sheet classification 3. However, the image forming apparatus 100 described in the present embodiment executes the second mode for the sheet range B.

In step S511, the CPU 401 sets the image forming conditions β (however, the LUTa2, the LUTb2, and the LUTc2 are not used) to the printer 20, and supplies an image signal for the test image to the dither processing unit 407 to thereby cause the printer 20 to form a test chart. Note that a specific example of a test chart is as described in relation to step S503.

When a user sets a test chart on the original platen glass 102 and instructs the start of reading from the operation unit U, in step S512, the CPU 401 uses the reader 10 to execute document fixed reading. For example, the CPU 401 may cause a message urging a user to set a test chart on the original platen glass 102 to be displayed on the operation unit U. As illustrated by FIG. 7C, the operation unit U may display a UI 700c that includes the message and the button 701c for instructing reading to start. A user opens the ADF unit A2 to cause the original platen glass 102 to be exposed, sets the test chart on the original platen glass 102, and presses the read start button of the operation unit U. When a read start instruction is inputted from the operation unit U, the CPU 401 instructs the reader 10 to perform document fixed reading. The reader 10 causes the document scanner A1 to read the test chart. The reader image processing unit 108 of the document scanner A1 outputs a luminance signal which indicates a reading result to the printer control unit 109. Subsequently, the CPU 401 advances to step S505.

Creation of LUTa

In step S505, the CPU 401 obtains density values of the test image. The CPU 401 uses the color processing unit 403 and the UCR unit 405 to obtain the read data of the test chart. The read data is obtained as an RGB image signal (referred to as a luminance signal). Based on LUTidCal 410, the color processing unit 403 converts the RGB image signal (luminance signal) to YMCBk densities. By this, a density is obtained for each test image of the ten tones. Note that the image forming apparatus 100 may be configured to be provided with the LUTidCal 410 for each sheet classification of a sheet. In this case, the color processing unit 403 may convert the luminance signal to a density based on the LUTidCal 410 corresponding to the sheet classification of the test chart.

In step S506, the CPU 401 generates an LUTa which is a tone correction condition, based on the image signal used to form the test image, and the densities of the test image obtained by the reader 10. When the sheet range A is selected the LUTa1 is created. When the sheet range B is selected the LUTa2 is created. The CPU 401 stores the created LUTa in the memory 402.

Case Where the Number of Test Charts is Two or more

Figure 9:
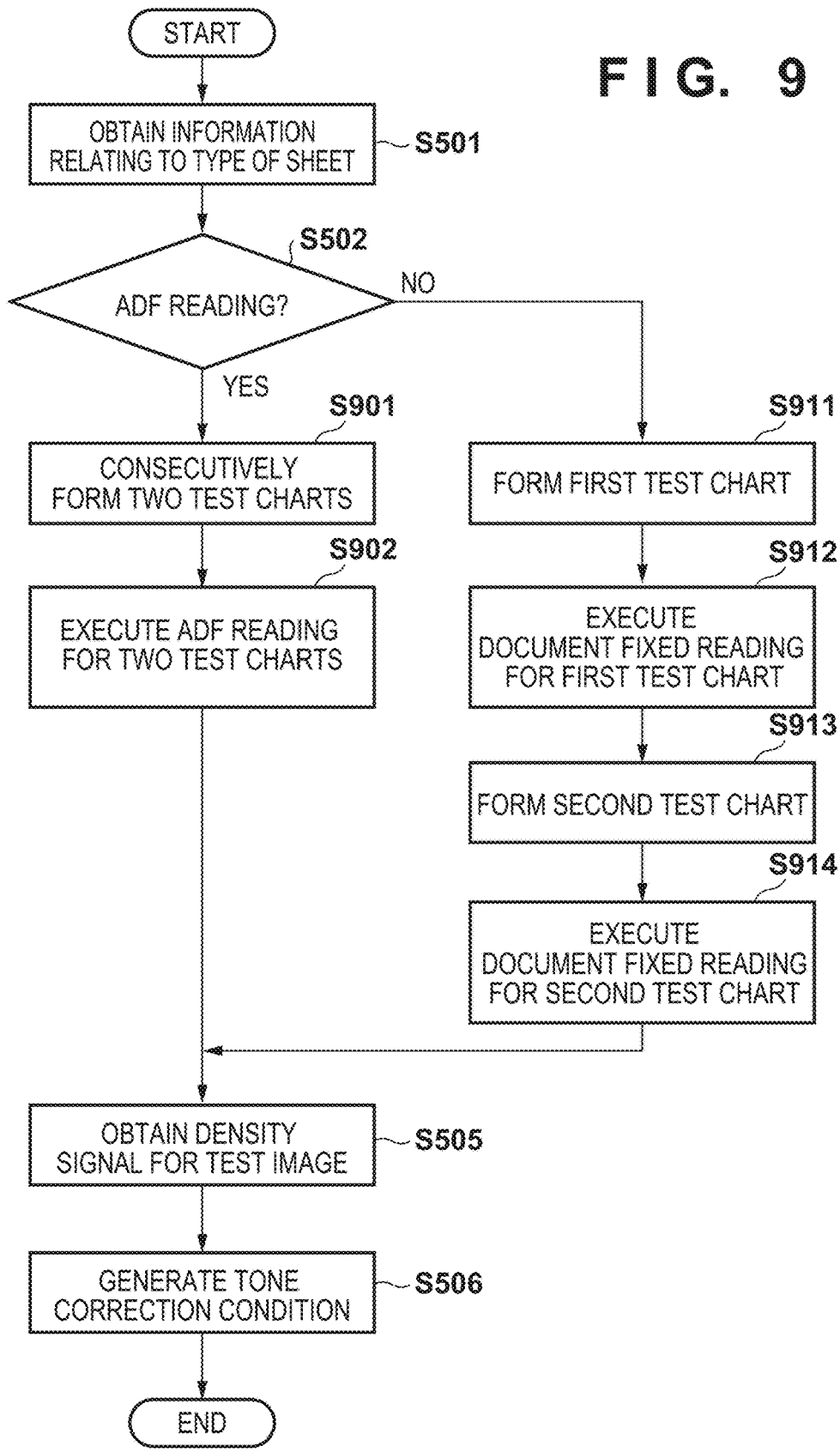
FIG. 9 is a flowchart for illustrating a calibration.

FIG. 9 illustrates calibration processing that uses two test charts. Note that the same reference numerals have been added to steps there are already described. As described above, the dither processing unit 407 may have a plurality of screens with respectively different numbers of lines. There are cases where the tone characteristics of an output image greatly differ between different numbers of lines. In such a case, a conversion table (tone correction conditions) may be created for each number of lines. However, it is difficult for a user to determine what calibration to apply for a screen having a specific number of lines. This is because it is difficult for a user to know the number of lines applied to an image such as text, lines or a photograph, and the number of lines applied to copying or the like. Accordingly, in a case where there are screens for a plurality of numbers of lines, if calibrations are executed together for the screens of all of the numbers of lines, burden on a user is reduced.

When it is determined in step S502 which is illustrated in FIG. 9 that ADF reading (the first mode) is possible, the CPU 401 advances to step S901. When it is determined in step S502 that ADF reading (the first mode) is not possible, the CPU 401 advances to step S911. Here respectively separate test charts are created for two screens.

First Mode

Figure 10A:
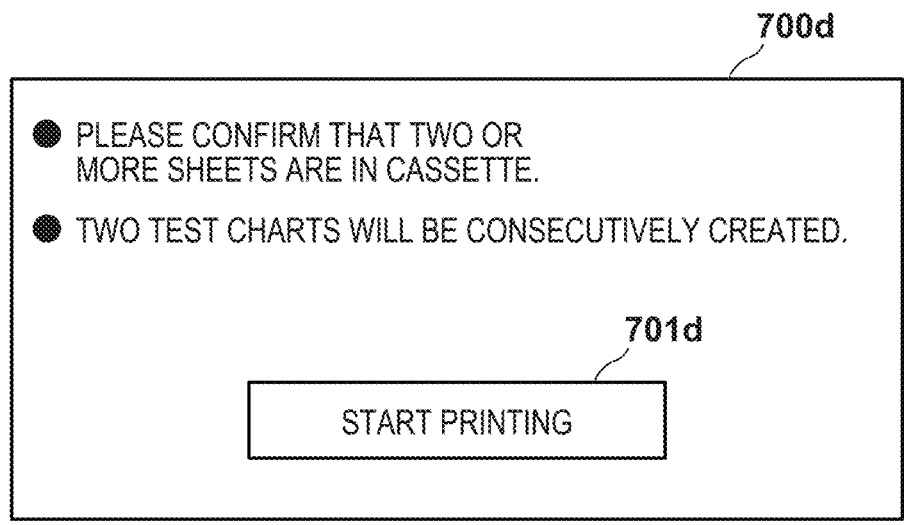
FIGS. 10A and 10B are views for describing UIs.

In step S901, the CPU 401 controls the printer 20 to consecutively form the two test charts 801a and 801b. For example, the CPU 401 displays a UI 700d as illustrated in FIG. 10A on the operation unit U. The UI 700d has a message for urging a user to confirm that two or more sheets are in the cassette 152, a message indicating that two test charts will be consecutively printed, and a button 701d for instructing the start of printing. When instructed to start printing, the CPU 401 sets the COPY screen to the dither processing unit 407, and outputs an image signal for a test image to the dither processing unit 407. The dither processing unit 407 uses the COPY screen to convert an 8-bit image signal to a 4-bit image signal. By this, the printer 20 creates the test chart 801a. Next, the CPU 401 sets the image screen to the dither processing unit 407, and outputs an image signal for a test image to the dither processing unit 407. The dither processing unit 407 uses the image screen to convert an 8-bit image signal to a 4-bit image signal. By this, the printer 20 creates the test chart 801b.

Figure 10B:
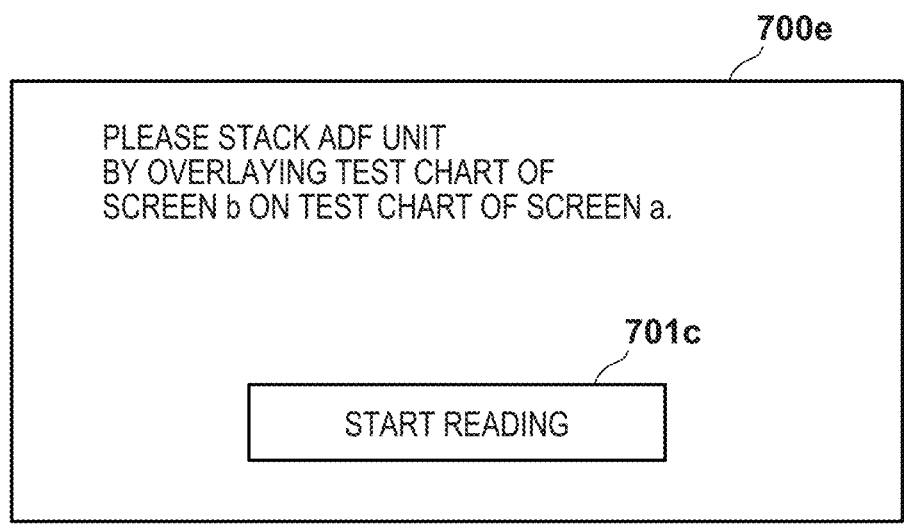

In step S902, the CPU 401 uses the reader 10 to execute ADF reading for the two test charts 801a and 801b. For example, the CPU 401 displays a UI 700e as illustrated in FIG. 10B on the operation unit U. The UI 700e includes a message urging a user to stack the image screen test chart 801b in the ADF unit A2 by overlaying it on the COPY screen test chart 801a. The printer 20 may print on the test charts 801a and 801b a message or a mark that indicates which screen has been applied. Upon detecting that the button 701c of the UI 700e has been pressed, the CPU 401 executes ADF reading by causing the ADF unit A2 to operate. The reader 10 causes the ADF unit A2 to convey the test charts 801a and 801b, and causes the document scanner A1 to read the test charts 801a and 801b. The reader image processing unit 108 of the document scanner A1 outputs a luminance signal which indicates a reading result to the printer control unit 109. Subsequently, the CPU 401 advances to step S505. In step S505 and step S506, the LUTa1 is created based on a result of reading the test chart 801a, and the LUTb1 is created based on a result of reading the test chart 801b.

Second Mode

Figure 11A:
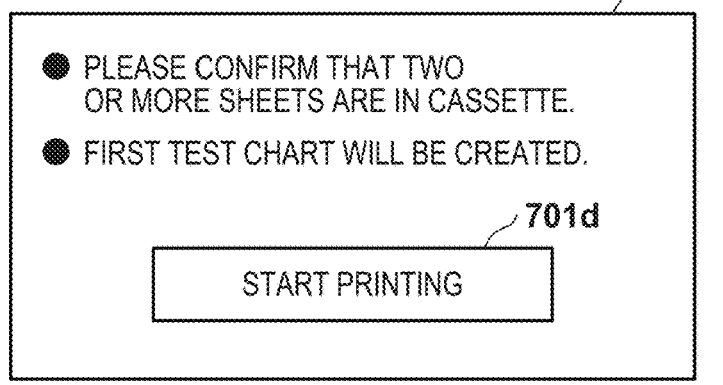
FIGS. 11A to 11D are views for describing UIs.

In step S911, the CPU 401 controls the printer 20 to form the first test chart 801a. For example, the CPU 401 displays a UI 700f as illustrated in FIG. 11A on the operation unit U. The UI 700d includes a message for urging a user to confirm that two or more sheets are in the cassette 152, a message indicating that the first test chart 801a will be printed, and the button 701d. When instructed to start printing, the CPU 401 sets the COPY screen to the dither processing unit 407, and outputs an image signal for a test image to the dither processing unit 407. The dither processing unit 407 uses the COPY screen to convert an 8-bit image signal to a 4-bit image signal. By this, the printer 20 creates the test chart 801a.

Figure 11B:
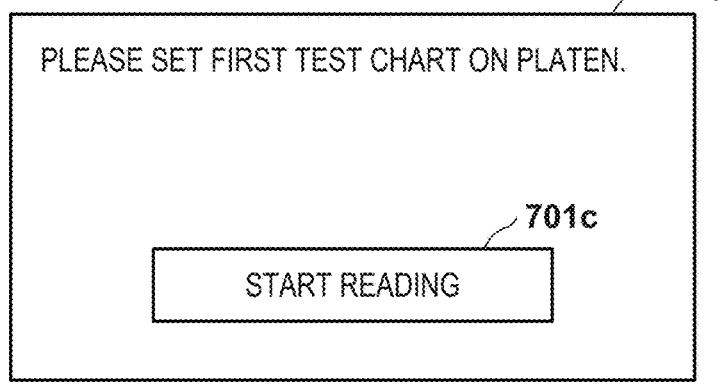

In step S912, the CPU 401 uses the reader 10 to execute document fixed reading for the first test chart 801a. For example, the CPU 401 displays a UI 700g as illustrated in FIG. 11B on the operation unit U. The UI 700g may have a message for urging a user to set the first test chart 801a on the original platen glass 102, and the button 701c. Upon detecting that the button 701c of the UI 700g has been pressed, the CPU 401 causes the document scanner A1 to read the test chart 801a. The reader image processing unit 108 of the document scanner A1 outputs a luminance signal which indicates a reading result to the printer control unit 109.

Figure 11C:
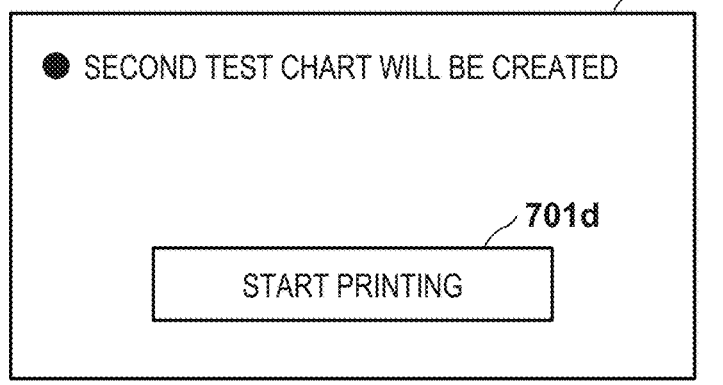

In step S913, the CPU 401 controls the printer 20 to form the second test chart 801b. For example, the CPU 401 displays a UI 700h as illustrated in FIG. 11C on the operation unit U. The UI 700h includes a message indicating that the second test chart 801b will be printed, and the button 701d. When instructed to start printing, the CPU 401 sets the image screen to the dither processing unit 407, and outputs an image signal for a test image to the dither processing unit 407. The dither processing unit 407 uses the image screen to convert an 8-bit image signal to a 4-bit image signal. By this, the printer 20 creates the test chart 801*b*.

Figure 11D:
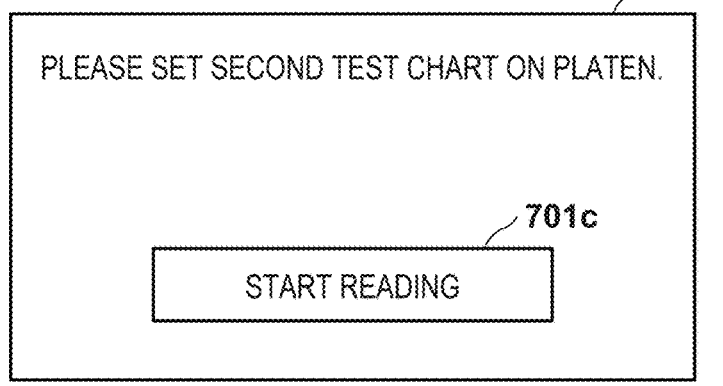

In step S914, the CPU 401 uses the reader 10 to execute document fixed reading for the second test chart 801*b*. For example, the CPU 401 displays a UI 700*i* as illustrated in FIG. 11D on the operation unit U. The UI 700*i* may have a message for urging a user to set the second test chart 801*b* on the original platen glass 102, and the button 701*c*. The CPU 401 causes the document scanner A1 to read the test chart 801*b* in response to the button 701*c* of the UI 700*i* being pressed. The reader image processing unit 108 of the document scanner A1 outputs a luminance signal which indicates a reading result to the printer control unit 109.

Subsequently, the CPU 401 advances to step S505. In step S505 and step S506, the LUTa2 which is a tone correction condition is created based on a result of reading the test chart 801*a*, and the LUTb2 is created based on a result of reading the test chart 801*b*. Here, two test charts 801*a* and 801*b* are formed, but three or more test charts may be formed. A pair of step S913 and step S914 are added for each single test chart.

[Effect]

By virtue of this embodiment, a first mode is applied for the sheet classification 1 and the sheet classification 2 out of the four sheet classifications 1 to 4 because they belong to the sheet range A. By this, operational burden for a user that involves calibration is reduced. FIG. 6B is a table for describing an effect of the present embodiment. Description is given here for the relationship between the number of test charts, the number of times the ADF unit A2 is stacked, and the calibration time. When there are two test charts, calibration time for the second mode is 60 seconds. This is because a test chart must be set on the original platen glass 102 each time a single test chart is printed. In contrast, the calibration work time in the first mode is 30 seconds. This is because work to set the test chart on the reader 10 can be done in half the time. From this table, the more the number of test charts there are the more the first mode is advantageous in comparison to the second mode regarding work burden and calibration time.

<Second Embodiment>

In the first embodiment, the reading mode is selected in accordance with a sheet range which is information relating to the type of a sheet. Therefore, the second mode is applied for the sheet classification 3 despite it being conveyable by the ADF unit A2. Accordingly, in the second embodiment, the CPU 401 selects a reading mode in accordance with whether a sheet can be conveyed in the ADF unit A2. In other words, in step S501 the CPU 401 accepts a designation of a sheet classification by a user. In step S502, based on the designated sheet classification, the CPU 401 selects a reading mode with reference to a table illustrated in FIG. 6C. By this, the first mode is also applied for the sheet classification 3.

[Effect]

In comparison to the first embodiment, ADF reading is also possible for the sheet classification 3 in the second embodiment. Accordingly, the work burden for a user and the calibration time may be further reduced. In this way, a sheet classification based on grammage may be employed as information relating to the type of a sheet.

<Third Embodiment>

In the third embodiment, a sheet size is used as information relating to the type of a sheet. The CPU 401 selects a reading mode in accordance with a sheet size that is inputted through the operation unit U. Typically, the size of a sheet that can be conveyed by the ADF unit A2 is smaller than the size of a sheet that can be printed on by the printer 20. In addition, because document fixed reading does not require sheet conveyance, the size of a sheet that can be read by document fixed reading is larger than the size of a sheet that can be read by ADF reading.

Accordingly, in the third embodiment, the CPU 401 selects a reading mode in accordance with a sheet size, with reference to a table illustrated in FIG. 6D. In other words, in step S501 the CPU 401 accepts a designation of a sheet size through the operation unit U. In step S502, based on the designated sheet size, the CPU 401 selects a reading mode with reference to a table illustrated in FIG. 6D. According to FIG. 6D, when an LTR size or an A4 size which are sheet sizes that can be conveyed by the ADF unit A2 is designated, the first mode is selected. When an LGR size or an A3 size which are sheet sizes that cannot be conveyed by the ADF unit A2 is designated, the second mode is selected.

[Effect]

By virtue of this embodiment, when a calibration reading mode in accordance with a sheet size is selected, a user's work burden or the like should be reduced. For example, in comparison to a case where document fixed reading is uniformly applied to all sheet sizes, in the present embodiment a user's work burden and the calibration time should be reduced. This is because ADF reading is applied for the LTR size and the A4 size.

<Fourth Embodiment>

In the fourth embodiment, a reading mode is selected in accordance with the existence or absence of a coating or the material (recycled paper or not recycled paper) of a sheet as information relating to a sheet type. Firstly, in step S501, the CPU 401 obtains information related to the type of a sheet through the operation unit U. As illustrated by FIG. 6E, a user designates one of recycled paper, thin paper, plain paper, thick paper, and coated paper through the operation unit U. Note that thin paper, plain paper, and thick paper are examples of paper that is not recycled and not coated. In step S502, based on the designated sheet type, the CPU 401 selects a reading mode with reference to a table illustrated in FIG. 6E. As illustrated by FIG. 6E, because recycled paper and coated paper cannot be conveyed by the ADF unit A2, the CPU 401 selects the second mode. Because unrecycled paper, non-coated paper, and the like can be conveyed by the ADF unit A2, the CPU 401 selects the first mode.

[Effect]

By virtue of this embodiment, when a calibration reading mode in accordance with the material of a sheet or the existence or absence of a coating is selected, a user's work burden or the like should be reduced. For example, in comparison to a case where document fixed reading is uniformly applied to all sheet sizes, in the present embodiment a user's work burden and the calibration time should be reduced. This is because ADF reading is applied for unrecycled paper and non-coated paper.

<CPU Functions>

Figure 12:
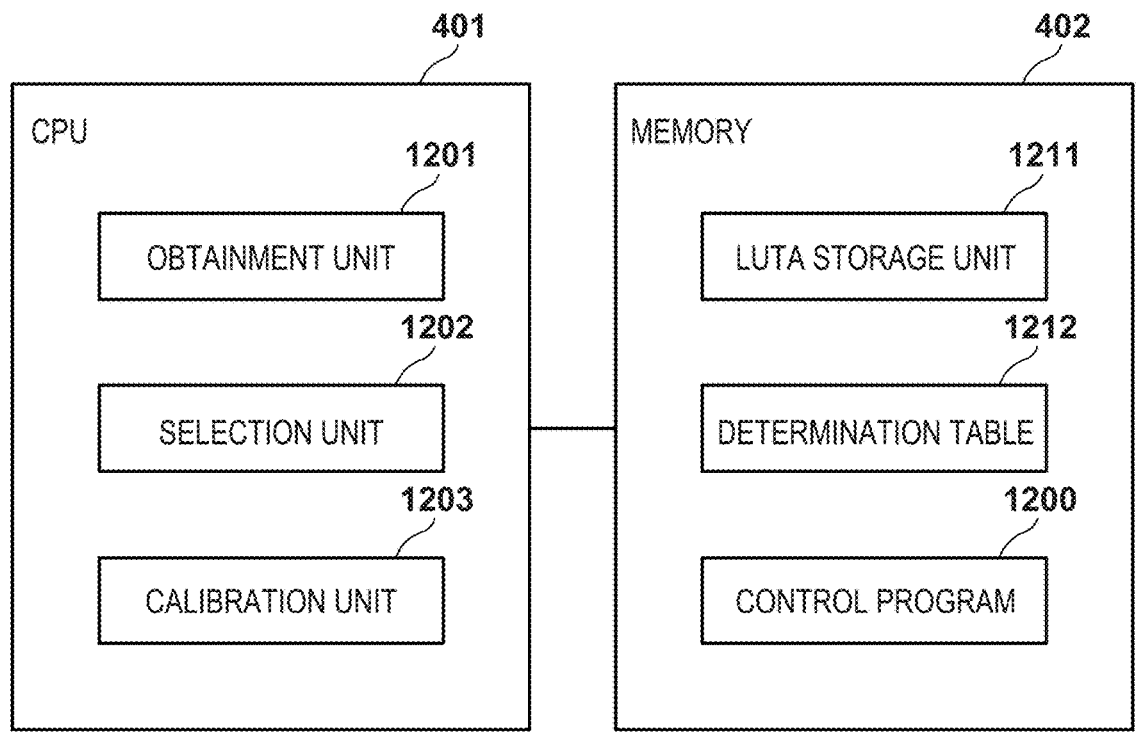
FIG. 12 is a view for describing functions of a CPU.

FIG. 12 illustrates functions that are realized by the CPU 401 executing a control program 1200 stored in the memory 402. An obtainment unit 1201 obtains information relating to a sheet type through the operation unit U or the like. A selection unit 1202 selects the first mode or the second mode in accordance with the sheet type. A calibration unit 1203 controls the printer 20 to cause a test image to be formed on a sheet. Furthermore, the calibration unit 1203 causes the reader 10 to read the test image formed on the sheet in the reading mode selected by the selection unit 1202. Furthermore, the calibration unit 1203 is an example of a creation unit for creating a correction condition (for example, an LUTa) for the sheet based on density information obtained by the reader 10. In this way, because the reading mode is selected in accordance with the sheet type, optimization of calibration is allowed while being able to execute calibration for various types of sheets. Note that the calibration unit 1203 causes an LUTa storage unit 1211 to store the created LUTa1, LUTa2, and the like.

The display apparatus of the operation unit U functions as a display unit. For example, as illustrated by FIG. 7B, when the selection unit 1202 selects the first mode, the operation unit U may display a message urging that a sheet be set on the original tray 302 of the ADF unit A2. For example, as illustrated by FIG. 7C, when the selection unit 1202 selects the second mode, the operation unit U may display a message urging that a sheet be set on the sheet tray. By this, a user can easily understand where to set a test chart.

As described in relation to the first embodiment, the type of a sheet may be the grammage of the sheet. The calibration unit 1203 may be configured to create correction conditions for each classification (for example, the sheet ranges A and B) relating to sheet grammage. As described in the first and second embodiments, the calibration unit 1203 may create a common first correction condition (the LUTa1) for a first classification (for example, the sheet classification 1) and a second classification whose grammage is greater than that of the first classification (for example, the sheet classification 2), which are classifications relating to sheet grammage. The calibration unit 1203 may be configured to create a common second correction condition (for example, the LUTa2) for a third classification (for example, the sheet classification 3), and a fourth classification (for example, the sheet classification 4), which have grammages that are greater than that of the second classification. Sheets of the first classification, the second classification, and the third classification can be conveyed by the ADF unit A2. Sheets of the fourth classification cannot be conveyed by the ADF unit A2. As described in the first embodiment, the selection unit 1202 may select the first mode for sheets of the first classification and the second classification, and select the second mode for sheets of the third classification and the fourth classification. As described in the second embodiment, the selection unit 1202 may select the first mode for sheets of the first classification, the second classification, and the third classification, and select the second mode for sheets of the fourth classification. Note that a determination table 1212 may be a table illustrated by any of FIG. 6A, FIG. 6C, FIG. 6D, and FIG. 6E. The selection unit 1202 may refer to the determination table 1212 to determine a reading mode.

As described by the third embodiment, the type of a sheet may be the size of the sheet. The selection unit 1202 may select the first mode for a sheet of a size that can be conveyed by the ADF unit A2, and select the second mode for a sheet of a size that cannot be conveyed by the ADF unit A2.

As described by the fourth embodiment, the type of a sheet may be the existence or absence of a coating with respect to the sheet. The selection unit 1202 may select the first mode for a sheet to which a coating is not applied, and select the second mode for a sheet to which a coating is applied. The type of a sheet may be whether or not it is recycled paper. The selection unit 1202 may select the first mode for unrecycled paper, and select the second mode for recycled paper.

As illustrated by FIG. 8, test images may be formed on the test chart 801a which is a first sheet and the test chart 801b which is a second sheet. As illustrated by FIG. 9, when the selection unit 1202 selects the first mode, the CPU 401 may cause the printer 20 to consecutively form test images on the first sheet and the second sheet, and cause the reader 10 to consecutively read the first sheet and the second sheet. When the selection unit 1202 selects the second mode, the CPU 401 causes the printer 20 to form a test image on the first sheet, and causes the reader 10 to read the first sheet. Furthermore, the CPU 401 causes the printer 20 to form a test image on the second sheet, and causes the reader 10 to read the second sheet. The printer 20 may form on a first sheet a test image to which screen processing of a first number of lines has been applied, and form on a second sheet a test image to which screen processing of a second number of lines different from the first number of lines has been applied.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-219327, filed Nov. 14, 2017, which is hereby incorporated by reference herein in its entirety.

What is claimed is:
1. An image forming apparatus comprising:
a reader configured to read an original placed on a platen glass;
a document feeder having an original tray on which the original is placed and configured to feed the original on the original tray to read the original placed on the original tray by the reader;

an image forming unit configured to form an image on a sheet based on a reading result of the original by the reader; and a controller configured to:
- control the image forming unit to form test patterns on a plurality of sheets;
- control the reader to read the test patterns on the plurality of sheets; and
- control, based on a reading result of the test patterns, an image forming condition of the image forming unit, wherein
the image forming unit forms a first test pattern on a first sheet among the plurality of sheets,
the image forming unit forms a second test pattern on a second sheet among the plurality of sheets after the first test pattern is formed on the first sheet,
in a case in which a first reading mode, in which the reader reads the test patterns on the plurality of sheets while the plurality of sheets are fed to the reader by the document feeder, is executed, the controller controls the image forming unit to form the first test pattern on the first sheet and to form the second test pattern on the second sheet before the first test pattern on the first sheet placed on the original tray is read by the reader, and
in a case in which a second reading mode, in which the reader reads the test patterns on the plurality of sheets without feeding the plurality of sheets by the document feeder, is executed, the controller controls the image forming unit to form the second test pattern on the second sheet after a reading of the first test pattern on the first sheet is started by the reader.

2. The image forming apparatus according to claim 1, wherein the controller obtains user instruction information relating to the plurality of sheets, and selects a reading mode from the first reading mode and the second reading mode based on the user instruction information.

3. The image forming apparatus according to claim 2, wherein the user instruction information includes a type of the plurality of sheets.

4. The image forming apparatus according to claim 2, wherein the user instruction information includes a grammage of the plurality of sheets.

5. The image forming apparatus according to claim 2, wherein the user instruction information includes a size of the plurality of sheets.

6. The image forming apparatus according to claim 2, wherein the user instruction information includes information indicating whether the plurality of sheets are coated.

7. The image forming apparatus according to claim 2, wherein the user instruction information includes information indicating whether the plurality of sheets are recycled paper.

8. The image forming apparatus according to claim 1, wherein the image forming condition corresponds to a tone characteristic of an image to be formed by the image forming unit.

9. The image forming apparatus according to claim 1, further comprising:
a conversion unit configured to convert image data based on a conversion condition,
wherein the image forming unit forms the image based on the converted image data, and
the controller generates the conversion condition as the image forming condition based on the reading result.

10. The image forming apparatus according to claim 9, wherein the conversion condition includes a first conversion condition and a second conversion condition different from the first conversion condition,
the controller generates the first conversion condition based on a reading result of the first test pattern, and
the controller generates the second conversion condition based on a reading result of the second test pattern.

11. An image forming method, comprising:
controlling an image forming unit to form test patterns on a plurality of sheets;
controlling a reader to read the test patterns on the plurality of sheets placed on a platen glass; and
controlling, based on a reading result of the test patterns, an image forming condition of the image forming unit, wherein
the image forming unit forms a first test pattern on a first sheet among the plurality of sheets,
the image forming unit forms a second test pattern on a second sheet among the plurality of sheets after the first test pattern is formed on the first sheet,
in a case in which a first reading mode, in which the reader reads the test patterns on the plurality of sheets while the plurality of sheets are fed to the reader by a document feeder, is executed, a controller controls the image forming unit to form the first test pattern on the first sheet and to form the second test pattern on the second sheet before the first test pattern on the first sheet placed on an original tray of the document feeder is read by the reader, and
in a case in which a second reading mode, in which the reader reads the test patterns on the plurality of sheets without feeding the plurality of sheets by the document feeder, is executed, the controller controls the image forming unit to form the second test pattern on the second sheet after a reading of the first test pattern on the first sheet is started by the reader.

* * * * *